Feb. 22, 1938.  J. A. BOYER ET AL  2,108,794
HARD CARBIDE COMPOSITION
Filed March 23, 1935  2 Sheets-Sheet 1

INVENTOR.
John A. Boyer
Carl G. Rose
BY R C Benner
ATTORNEY.

Patented Feb. 22, 1938

2,108,794

UNITED STATES PATENT OFFICE 2,108,794

HARD CARBIDE COMPOSITION

John A. Boyer and Carl G. Rose, Niagara Falls, N. Y., assignors, by mesne assignments, to The Carborundum Company, Niagara Falls, N. Y., a corporation of Delaware Application March 23, 1935, Serial No. 12,588

10 Claims. (Cl. 75—136)

This invention relates to abrasive or wear resistant materials composed of a fused mixture of carbides, or to a material in which a hard carbide crystallizes from a fused mass in the presence of alloying ingredients. The invention is concerned particularly with materials which contain a substantial proportion of a carbide harder than 9 on the Moh scale of hardness, as for example, boron carbide or silicon carbide, together with other ingredients either retained in solid solution or crystallized as separate constituents.

Fused carbides have a number of characteristics which are very desirable in an abrasive grain, but up to the present time, the use of carbides as bonded abrasives has been confined almost entirely to silicon carbide, which is infusible. Silicon carbide is ordinarily produced in the form of crystalline plates deposited from vapor; these plates have sharp edges, but have a tendency to be laminated and are not characterized by a high degree of toughness. Boron carbide, which is somewhat harder than silicon carbide, can be fused, but the crude material as it comes from the furnace is usually quite porous, and the crushed grain is almost devoid of sharp crystalline edges.

In accordance with the present invention, it is possible to produce a fused carbide composition which is characterized by a sharp crystalline fracture, and which at the same time retains the desirable properties of a fused abrasive material. In the case of boron carbide, it is also possible to vary the physical properties and type of fracture over a considerable range, as for example, from a material giving a dense metallic fracture to one having a fracture which is highly crystalline, by the addition of alloying ingredients.

We have found that certain carbides, when fused, have the property of dissolving in each other to form products which are characterized by extreme hardness, and which have structures very similar to those found in metallic alloys. For example, fused boron carbide will dissolve certain carbides having a hardness of approximately 9 or greater on the Moh scale of hardness, and particularly zirconium carbide, tungsten carbide, molybdenum carbide, chromium carbide and titanium carbide, to form products having physical properties differing from those of pure fused boron carbide. We have also found that silicon carbide, which cannot be fused without decomposition, can be dissolved in a molten carbide such as boron carbide to produce a fusible melt, and that this fusibility can be retained up to very high percentages of silicon carbide. Thus, although silicon carbide cannot be fused in the pure state under ordinary conditions, it can be crystallized from a molten material in which it is soluble. Similar fused products can be obtained in which zirconium carbide forms the base or solvent, but boron carbide is preferable as a base material because of its extreme hardness.

In the solidification of boron carbide melts containing other added ingredients, the boron carbide has the property of retaining certain elements or their carbides in solid solution up to appreciable percentages, and these solid solutions are dense, tough, and very resistant to wear or abrasion. When the limit of solid solubility is exceeded, a duplex structure results, which usually appears as eutectic or as very finely divided particles of the added carbide distributed through a hard tough matrix consisting of boron carbide or of boron carbide solid solution. With increasing proportions of the added ingredients, it is possible to produce an almost continuous crystal skeleton of a hard carbide having its interstices filled with a matrix in which boron carbide is the principal constituent. Such a material fractures along the planes of the crystal skeleton to give a sharp crystalline fracture, but when the material is crushed into grain, the individual particles retain the fused boron carbide matrix between the boundary planes along which the material is fractured. This boron carbide matrix is very hard and also very tough, so that the crushed grain, while sharp and angular, still retains to a considerable extent the characteristics of fused boron carbide.

The nature of the present invention will be more clearly understood from a consideration of the accompanying drawings.

The physical properties of the respective fused carbide compositions, and the method of varying the properties of a fused carbide such as boron carbide by the addition of alloying ingredients, will be understood from a detailed consideration of the drawings.

Boron carbide is commercially manufactured by the reduction of a mixture of boric oxide with carbon, using a central conducting core of carbon surrounded by the raw mixture. The fused boron carbide, even when manufactured under conditions which give a continuous product free from graphite cleavage planes, often contains a small quantity of free graphite, as for example, from one to two per cent. This graphite separates as very thin intergranular graphite flakes, and produces a granular fracture. When a small amount of silicon carbide is added to the boron carbide, this granular structure is eliminated, and the material appears as homogeneous under the microscope. Upon etching, an occasional crystal of silicon carbide can be observed in the boron carbide matrix, but with this exception the material is free from discontinuity.

Figure 1:
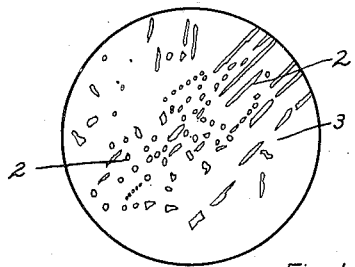
Figure 1 shows the microstructure of a boron carbide silicon carbide fusion which contains approximately 25 per cent silicon carbide, and which has a eutectic structure.

When the silicon carbide content is increased to approximately 25 per cent, the material has a structure resembling that of a eutectic, in which the silicon carbide is distributed as very finely divided particles embedded in a matrix of boron carbide or of boron carbide solid solution containing dissolved silicon carbide. The structure of such a material is shown in Figure 1, where the small rounded particles 2 are silicon carbide, and the matrix 3 consists of boron carbide containing some silicon or silicon carbide in solid solution. In the absence of thermal curves, it is difficult to determine whether the structure is that of a true eutectic or of a material such as a eutectoid, which results from the decomposition of a solid phase into two constituents. The two structures, as is well known, are very similar. It is sufficient for descriptive purposes, however, to state that the material has a eutectic structure.

Figure 2:
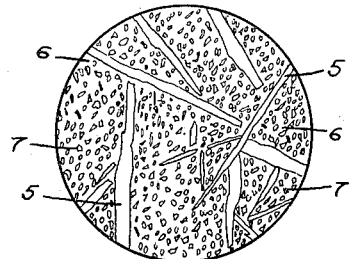
Figure 2 shows the microstructure of a fusion higher in silicon carbide than that shown in Figure 1.

With higher silicon carbide content, the silicon carbide crystallizes as interlocking plates embedded in a matrix of boron carbide and silicon carbide having a eutectic structure. This structure is shown in Figure 2, where the silicon carbide plates 5 are embedded in a matrix 6 of boron carbide, which contains small globules 7 of silicon carbide.

Figure 3:
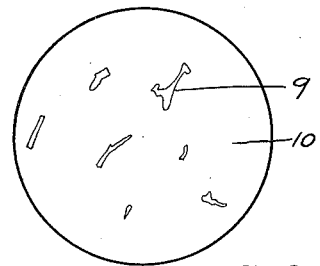
Figure 3 shows the microstructure of a boron carbide fusion containing approximately 15 per cent zirconium carbide.
Figure 4:
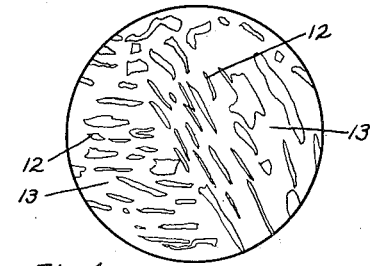
Figure 4 shows the microstructure of a boron carbide fusion containing approximately 40 per cent zirconium carbide.

Zirconium carbide is also miscible with boron carbide, and apparently forms solid solutions through a limited range. These fusions can be readily produced by simultaneous reduction of the oxides by carbon, or by the fusion of the carbides in the proportion desired. The microstructure of a fusion made by the reduction of boric oxide and zirconia in the proportions to form a fusion containing 15 per cent zirconium carbide and 85 per cent boron carbide is shown in Figure 3. There are a few intergranular eutectic stringers 9 in a matrix 10 of boron carbide, but the quantity of constituent is so small for the quantity of zirconium carbide added that some of the zirconium is evidently retained in solid solution. When the zirconium carbide content is increased to approximately 40 per cent, a eutectic structure is produced, as shown in Figure 4. In this figure the zirconium carbide constituent 12 is embedded in a matrix 13 of boron carbide (or boron carbide containing dissolved zirconium carbide). Although the material shown in Figure 4 has cleavages along which it can fracture, it also possesses considerable toughness, and is characterized by the hardness of the boron carbide matrix 13.

Although a carbide fusion having the structure shown in Figure 4 shows definite cleavage planes, the crystalline nature of the fracture can be considerably increased by introducing enough of the second carbide to form a more or less continuous crystal skeleton throughout the material. A boron carbide fusion containing approximately 50 per cent of silicon carbide is a typical example of such a product. The structure of such a product is shown in Figure 2, and this type of material, which fractures along the planes of a crystal skeleton, gives much coarser cleavages than the structure shown in Figure 4.

Figure 5:
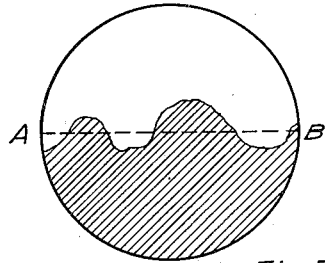
Figure 5 illustrates the contour of a fracture of the usual commercial fused boron carbide.

The difference in contour of the fracture of the material containing a crystal skeleton in comparison with that of commercial fused boron carbide will be evident from a comparison of Figures 5, 6, 7 and 8. The usual fused boron carbide has a somewhat rounded irregular fracture, such as is indicated in Figure 5. The nature of this fracture can best be realized by grinding the fracture so that the projections are smoothed to plane surfaces, and discontinuing the grinding operation before the deeper portions of the fractured surface are reached. If the fracture is rounded, as is the case when the material breaks along intergranular voids or intergranular graphite flakes, the smooth areas appear as irregular shaped "islands", and the deeper portions of the fracture of course appear black because polishing has not been carried sufficiently far to reach these portions of the specimen. If the fracture is sharp and angular, the smoothed portions will appear as more or less perfect geometric figures.

Figure 6:
Figure 6 shows a polished surface of the fracture shown in Figure 5, the specimen being ground to a depth indicated by the line AB in Figure 5 and polished.

When the projections of the fracture shown in Figure 5 are ground and polished to a depth indicated by the line AB, the microsection has the appearance of that shown in Figure 6. The white polished areas 15 correspond to the projections which have been ground to a plane surface, whereas the black areas 16 are the portions of the fracture not reached by the grinding and polishing operations. The rounded irregular shape of the projections, which show as white polished areas in Figure 6, is characteristic of the usual fused boron carbide.

Figure 7:
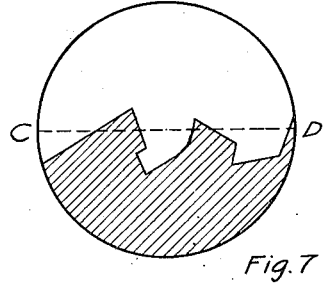
Figure 7 illustrates the contour of a fracture produced by a fusion of two carbides, one of which forms a crystal skeleton and the other of which fills the interstices to form a matrix.
Figure 8:
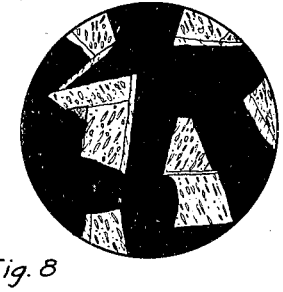
Figure 8 shows a polished section of a fracture of the character shown in Figure 7, the specimen being ground to a depth indicated by the line CD in Figure 7 and then polished.

In a fusion which upon solidification gives a fairly continuous crystal skeleton throughout the matrix (as for example, in a boron carbide fusion containing from about 35 to 60 per cent silicon carbide), the material breaks along the plates or the crystals of the skeleton to give an angular fracture of the type shown in Figure 7. When the projections of the fracture are smoothed to a plane surface, as described in connection with Figures 5 and 6, (as for example, to a depth indicated by the line CD in Figure 7) a considerable number of the projecting surfaces appear as almost perfect geometrical figures, as is indicated in Figure 8. The crushed grain retains these angular characteristics, as distinguished from the rounded irregular shaped grain obtained by crushing the commercial fused boron carbide.

A typical microstructure producing an angular crystalline fracture of the type shown in Figures 7 and 8 is shown in Figure 2, where the specimen is a fusion or "alloy" containing approximately 50 per cent silicon carbide, the balance being boron carbide. In the material filling the interstices between the interlocking crystal plates, the silicon carbide is distributed in a continuous matrix of boron carbide (or boron carbide solid solution); this matrix is both harder and tougher than silicon carbide, and when it is retained between the silicon carbide plates of the crystal skeleton, furnishes an angular grain which is appreciably harder and tougher than silicon carbide itself.

Figure 9:
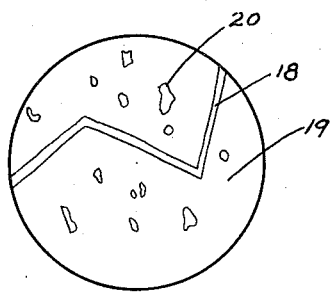
Figure 9 shows the microstructure of a boron carbide-tungsten carbide fusion containing approximately 30 per cent tungsten carbide.

Tungsten carbide is also extremely hard, and when added to boron carbide in a proportion of, for example, from 20 to 30 per cent, forms a fairly continuous angular network throughout the material. Figure 9 shows the structure of a boron carbide fusion containing approximately 30 per cent tungsten carbide. The tungsten carbide constituent 18 divides the material into more or less angular areas, although the crystal skeleton is not as well developed as is the case with silicon carbide. The boron carbide matrix 19 contains small particles 20 of tungsten carbide. For wear resisting properties, where it is not desired to break the material into abrasive grain, a smaller percentage of tungsten carbide can be added. Fusions in which tungsten or molybdenum carbides form the predominant constituent, and to which boron carbide is added in a minor proportion, are also very hard and tough and are resistant to wear or abrasion.

Structures of the crystal skeleton type can also be produced with zirconium carbide. Silicon carbide, for example, can be dissolved in zirconium carbide so as to form a crystal skeleton in a zirconium carbide matrix.

Figure 10:
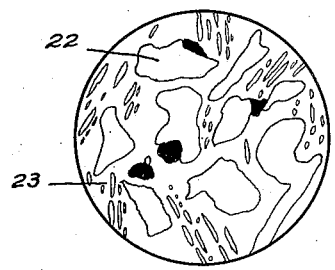
Figure 10 shows the microstructure of a material made by mixing silicon carbide grains with boron carbide powder and heating to approximately the fusion temperature of the boron carbide—silicon carbide eutectic.

In the preceding types of structures, the materials have been completely fused. A somewhat different type of structure can be produced by partial fusion when one of the constituents is introduced in the form of grains and the other constituent or constituents introduced as fine powder. For example, if silicon carbide grains are briquetted with finely divided boron carbide powder and the mixture heated to the fusion temperature of the boron carbide—silicon carbide eutectic (or to the fusion temperature of some intermediate "alloy" of boron carbide and silicon carbide), the structure shown in Figure 10 is obtained. In this structure the silicon carbide does not form a crystal skeleton, but consists of grains of silicon carbide 22 embedded in a fused material 23 having a eutectic structure. This product is in reality a bonded aggregate in which the silicon carbide grains are bonded with fused boron carbide, or with a fused mixture or "alloy" of silicon carbide and boron carbide. The silicon carbide-boron carbide compositions of this type can be used for moulded objects where extreme hardness or wear resistance is required. When both materials are introduced in the form of powders, the entire mass can be fused, and with from approximately 30 to 60 per cent silicon carbide, a crystal skeleton results. With high percentages of silicon carbide, as for example from 75 to 95 per cent silicon carbide, it is more difficult to completely fuse the material without decomposition of the silicon carbide, but with the application of pressure, fusions containing very high percentages of silicon carbide can be readily obtained. The addition of small percentages of boron carbide to silicon carbide makes possible the fusion of the material under conditions where silicon carbide itself cannot be fused.

A method of producing non-porous silicon carbide-boron carbide alloys comprises impregnating the pores of a formed silicon carbide article with molten boron carbide, or with a fusion of boron carbide containing dissolved silicon carbide. Boron carbide does not melt until a temperature very close to the decomposition temperature of silicon carbide, so that very rapid heating and careful control of temperature are necessary. The formed silicon carbide article, preferably recrystallized, can be positioned in a carbon crucible held between two large carbon electrodes and the article then surrounded with solid boron carbide, or preferably a crushed prefused mixture containing boron carbide and from 20 to 35 per cent silicon carbide. The silicon carbide fusion seems to melt at a lower temperature, or at least minimizes graphitization of the outer surface of the article. The crucible is then heated rapidly to a temperature of about 2400–2500° C., the total time of heating preferably being only about 30 seconds to one minute, although a somewhat longer time can be employed if the heating schedule is regulated to prevent graphitization of the silicon carbide before the boron carbide melts.

Figure 11:
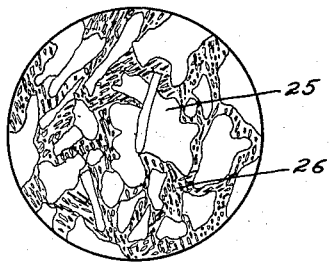
Figure 11 shows the structure of recrystallized silicon carbide impregnated with molten boron carbide.

The structure of the impregnated product is shown in Figure 11, where the silicon carbide grains 25 are embedded in a network 26 of boron carbide and silicon carbide. The network shows a eutectic structure.

All of the fusions herein described can be utilized for the manufacture of molded products by crushing or powdering the fused material, molding it to shape, and heating the molded article to a temperature sufficient to produce either sintering or incipient fusion. Most of the fusions described do not have sharp melting points, but melt over a considerable range of temperatures. When such a material is heated, it usually passes through a more or less pasty or partially fused stage before complete fluidity is reached. This property is of advantage in making self-bonded articles in comparison with a material which has a definite melting point. In the latter case the material passes from solid to liquid without a change in temperature when the melting point of the material is reached. With materials of the "alloy" type, where the incipient fusion temperature is below the temperature of complete fusion, the material can be kept in a partially fused condition for an indefinite time without further fusion taking place, and much less accurate temperature control is needed to produce partial or incipient fusion without loss of shape. These materials are also adapted to sintering or self-bonding under pressure. The powdered prefused or "alloyed" materials, or mixtures of the individual carbides, can also be melted or partially melted under pressure to give dense products characterized by extreme hardness and resistance to wear.

There are a number of methods by which the various fusions described can be prepared. These may be summarized as follows:

(1) Fusion of a mixture of the respective carbides in a powdered condition, preferably in briquetted form.

(2) Simultaneous reduction of the respective oxides with carbon.

(3) Fusion of the carbide forming the principal ingredient of the mixture in the presence of another oxide or oxides. This process of course assumes that the principal ingredient is fusible, and the method can be carried out either with or without the addition of carbon to the mix, depending upon the final product desired, and the probability of absorbing carbon from the surroundings or the atmosphere. In the case of boron carbide, additional boric oxide-carbon mixture can be added if desired to decrease the amount of boron carbide required.

In making the various fusions, contamination with excess carbon must be avoided. Fused boron carbide takes up carbon very readily when molten, but we have found that many briquetted mixtures of carbides containing substantial proportions of boron carbide can be fused in an induction furnace while packed in powdered coke without appreciable contamination. This is particularly true of the silicon carbide-boron carbide fusions containing substantial percentages of silicon carbide. It is desirable, however, to coat the briquetted materials with a slurry of finely divided sand and carbon suspended in water before burying the mixture in powdered or crushed coke. In order to completely prevent contamination, heating can be effected in an atmosphere of inert gas.

In the simultaneous reduction of the oxides by carbon, a resistance type furnace can be used, in which a solid conducting core of carbon is buried within a loose mixture of the respective oxides and carbon. In a furnace of this type, a mix containing boric oxide usually becomes somewhat "pasty" when heated, and the gas pressure or vaporization within the furnace causes the mixture to separate from the core. The core is operated at a temperature sufficient to fuse the carbide mixture after reduction, and when the charge is removed from the furnace, a layer of fused material is obtained immediately surrounding the cavity formed around the core. The mix used is in approximately the stoichiometric proportions to give the respective carbides desired in the fusion. It has been found in the commercial manufacture of boron carbide that the addition of volatile organic liquid such as kerosene to the mix has a desirable effect upon the operation of the furnace, and such a procedure can of course be used in the reduction of the mixed oxides.

When boron carbide is melted in the presence of another oxide, it is possible to obtain melts which are deficient in carbon over the theoretical ratio required to convert the entire mix to carbides. As an example, when a charge consisting of 50 percent silica and 50 percent boron carbide is treated in the resistance type furnace of the type above described, a fused material is obtained which contains silicon carbide, but does not contain sufficient carbon to convert all of the boron present to boron carbide. This material has the same general structure shown in Figure 2, and hardness tests based on resistance to abrasion or lapping give a higher hardness value for the fused product than for either silicon carbide or fused boron carbide.

The compositions corresponding to the microstructure shown in the drawings are given merely as illustrative examples of the structures obtainable in fusions containing boron carbide. Structures resembling those shown can also be obtained with ternary compositions, as for example, with fusions containing silicon carbide, boron carbide and one of the other carbides of the group comprising tungsten carbide, molybdenum carbide, and zirconium carbide. These compositions form homogeneous melts over wide ranges of compositions. The addition of tungsten carbide to boron carbide-silicon carbide fusions seems to increase the range of solid solubility of silicon carbide in the fused matrix. For example, a fusion containing 20 per cent silicon carbide and 5 per cent tungsten carbide, the balance being boron carbide, shows only traces of a eutectic structure, whereas a similar melt without the tungsten carbide shows a eutectic structure over a considerable proportion of the area of the microsection.

The present invention can be defined as being within the scope of the following claims:

We claim:

1. As a new manufacture, a fused carbide composition consisting essentially of boron carbide and silicon carbide, in which silicon carbide is present as a separate crystalline phase which has solidified from a fused mass.

2. As a new manufacture, a fusion of boron carbide and silicon carbide, in which the silicon carbide occurs at least in part in the form of microscopic particles distributed throughout a matrix in which boron carbide forms the basic ingredient.

3. As a new manufacture, a composition consisting of boron carbide and silicon carbide, in which a substantial proportion of the composition is characterized by a eutectic structure.

4. As a new manufacture, a composition consisting of boron carbide and silicon carbide in which at least a part of the silicon carbide is crystallized in a form which is characteristic of a eutectic.

5. As a new manufacture, a fusion of boron carbide and silicon carbide containing from 20 to 60 per cent silicon carbide.

6. As a new manufacture, a fusion of boron carbide and silicon carbide in which the silicon carbide occurs partly in a form characterized by a eutectic structure and partly as crystalline plates, both the eutectic particles and the plates being distributed throughout a matrix of boron carbide.

7. As a new manufacture, a fusion consisting principally of boron carbide and silicon carbide in which the silicon carbide occurs partly in a form characterized by a eutectic structure and partly as a crystalline skeleton which divides the fused material into volumes which are bounded by substantially plane surfaces.

8. As a new manufacture, a fusion consisting principally of boron carbide and silicon carbide, the said fusion being characterized by a crystal skeleton of silicon carbide, the interstices of the said skeleton being filled with a fused matrix containing both silicon carbide and boron carbide.

9. As a new manufacture, a fused composition of boron carbide and silicon carbide containing from 20 to 50 per cent silicon carbide, in which the silicon carbide is dispersed as microscopic particles which have crystallized from the liquid phase, the said particles being distributed throughout a matrix of boron carbide, the carbon content of the composition being in approximately the stoichiometric proportions to form silicon and boron carbides.

10. As a new manufacture, a fused composition of boron carbide and silicon carbide containing from 20 to 50 per cent silicon carbide, in which the boron carbide forming the matrix of the composition contains silicon carbide particles crystallized in the form of a eutectic.

JOHN A. BOYER.
CARL G. ROSE.